United States Patent
Ramachandra et al.

(10) Patent No.: US 10,809,986 B2
(45) Date of Patent: Oct. 20, 2020

(54) SYSTEM AND METHOD FOR DYNAMIC TRANSLATION CODE OPTIMIZATION

(71) Applicant: Walmart Apollo, LLC, Bentonville, AR (US)

(72) Inventors: Madhavan Kalkunte Ramachandra, Bangalore (IN); Siddharth Sharma, Delhi (IN)

(73) Assignee: Walmart Apollo, LLC, Bentonville, AR (US)

( * ) Notice: Subject to any disclaimer, the term of this patent is extended or adjusted under 35 U.S.C. 154(b) by 5 days.

(21) Appl. No.: 15/997,065

(22) Filed: Jun. 4, 2018

(65) Prior Publication Data
US 2019/0317745 A1   Oct. 17, 2019

(30) Foreign Application Priority Data
Apr. 16, 2018   (IN) .............................. 201811014359

(51) Int. Cl.
*G06F 9/44*   (2018.01)
*G06F 9/45*   (2006.01)
(Continued)

(52) U.S. Cl.
CPC .............. *G06F 8/447* (2013.01); *G06F 8/443* (2013.01); *G06F 8/77* (2013.01); *G06F 40/154* (2020.01); *G06F 40/205* (2020.01)

(58) Field of Classification Search
CPC . G06F 8/447; G06F 8/443; G06F 8/77; G06F 17/227; G06F 17/2705; G06F 40/205; G06F 40/154
See application file for complete search history.

(56) References Cited

U.S. PATENT DOCUMENTS 9,335,982 B1 * 5/2016 Morgan .................... G06F 8/52
9,720,971 B2   8/2017 Bittner et al.
(Continued)

OTHER PUBLICATIONS

Takeshi Yamada, A Case Study of User-Defined Code Transformations for Data Layout Optimizations, 2015, pp. 535-541. https://ieeexplore.ieee.org/stamp/stamp.jsp?tp=&arnumber=7424771&isnumber=7424253 (Year: 2015).*
(Continued)

*Primary Examiner* — Mongbao Nguyen
(74) *Attorney, Agent, or Firm* — McCarter & English, LLP

(57) ABSTRACT

An system and a method for the optimization of dynamic code translation is disclosed. A cloud-based front-end application receives an input module, rule specification and a translation definition. The cloud-based front-end application transmits the input module, rule specification and translation definition to a back-end processing module. The back-end processing module parses the three inputs and stores them in separate data structures. The back-end processing module performs a non-executing analysis of the translation definition based on the rule specification, generating a set of defects. The back-end processing module performs an execution of the translation definition with the input module, generating a report of system metrics. The set of defects and the system metrics are transmitted back to a GUI running on the cloud-based front-end application.

20 Claims, 8 Drawing Sheets

(51) Int. Cl.
  *G06F 9/445*    (2018.01)
  *G06F 8/41*     (2018.01)
  *G06F 8/77*     (2018.01)
  *G06F 40/154*   (2020.01)
  *G06F 40/205*   (2020.01)

(56) References Cited

U.S. PATENT DOCUMENTS

| | | | | |
|---|---|---|---|---|
| 2004/0139421 A1* | 7/2004 | Hall | ............ | G06F 8/30 |
| | | | | 717/101 |
| 2006/0242172 A1* | 10/2006 | Tsyganskiy | ............ | G06F 8/72 |
| 2006/0282458 A1* | 12/2006 | Tsyganskiy | ............ | G06F 8/72 |
| 2008/0244560 A1* | 10/2008 | Neagu | ............ | G06F 8/70 |
| | | | | 717/174 |
| 2009/0327196 A1 | 12/2009 | Studer et al. | | |
| 2010/0057673 A1* | 3/2010 | Savov | ............ | G06F 16/258 |
| | | | | 707/E17.002 |
| 2010/0257443 A1* | 10/2010 | Zernik | ............ | G06F 17/24 |
| | | | | 715/239 |
| 2011/0119309 A1 | 5/2011 | Aronson et al. | | |
| 2013/0117429 A1* | 5/2013 | Koponen | ............ | H04L 41/00 |
| | | | | 709/223 |
| 2013/0125098 A1* | 5/2013 | Dhoolia | ............ | G06F 8/51 |
| | | | | 717/137 |
| 2013/0283106 A1* | 10/2013 | King | ............ | G06Q 10/083 |
| | | | | 714/49 |
| 2013/0318486 A1* | 11/2013 | Sasaki | ............ | G06F 30/30 |
| | | | | 716/106 |
| 2015/0331780 A1* | 11/2015 | Huang | ............ | G06F 11/362 |
| | | | | 717/131 |
| 2016/0011905 A1* | 1/2016 | Mishra | ............ | G06Q 10/06 |
| | | | | 718/102 |
| 2016/0050129 A1* | 2/2016 | Hoyne | ............ | H04L 43/08 |
| | | | | 709/224 |
| 2016/0239512 A1* | 8/2016 | Madisch | ............ | G06F 16/955 |
| 2016/0328544 A1* | 11/2016 | Baudel | ............ | G06F 8/70 |
| 2016/0371060 A1* | 12/2016 | Goja | ............ | G06F 8/51 |
| 2017/0091180 A1* | 3/2017 | Yamaguchi | ............ | G06F 8/41 |
| 2017/0103078 A1* | 4/2017 | Greenblatt | ............ | G06F 17/2247 |
| 2018/0039490 A1* | 2/2018 | Gass | ............ | G06F 8/65 |
| 2018/0081655 A1* | 3/2018 | Kudriavtsev | ............ | G06F 8/30 |
| 2018/0096053 A1* | 4/2018 | Panwar | ............ | G06F 9/54 |
| 2018/0101370 A1* | 4/2018 | Huang | ............ | G06F 8/443 |
| 2018/0246944 A1* | 8/2018 | Yelisetti | ............ | G06F 16/258 |
| 2019/0243629 A1* | 8/2019 | Gass | ............ | G06F 8/64 |
| 2020/0167143 A1* | 5/2020 | Gass | ............ | G06F 8/65 |

OTHER PUBLICATIONS

International Search Report and Written Opinion for PCT/US2019/27648 dated Jul. 10, 2019, pp. 1-16.

* cited by examiner

```xml
<TSOrder
xmlns="http://www.sample.com/mtep/fulfillmentservice/FulfillmentOrderSample"
xmlns:xsi="http://www.w3.org/2001/XMLSchema-instance" Version="196">
        <CustomerInfo FirstName="John" LastName="Doe" ID="12345">
                <CustomerAddress>
                        <AddressLine1>555 1st Street</AddressLine1>
                        <AddressLine2 />
                        <City>New York</City>
                        <County>USA</County>
                        <State>NY</State>
                        <DayPhone>5551234567</DayPhone>
                        <Email>JohnDoe@sample.com</Email>
                        <PostCode>10001</PostCode>
                </CustomerAddress>
                <DeliveryInstructions>None</DeliveryInstructions>
        </CustomerInfo>
        <OrderInfo DetailLines="31">
                <OrderNumber>52342666</OrderNumber>
                <Zone>123</Zone>
                <GroupID>5</GroupID>
                <PlannedDeliveryTime>15:53</PlannedDeliveryTime>
                <ScheduleTimeSlot>12:45PM-12AM</ScheduleTimeSlot>
                <FulfillmentDate>2014-12-01</FulfillmentDate>
                <OrderMessage>52342666</OrderMessage>
                <DeliveryCharge>5.0</DeliveryCharge>
                <OrderTotal>119.21</OrderTotal>
                <Authorized>false</Authorized>
                <ScheduleNumber>173</ScheduleNumber>
                <OrderLine>
                        <ProdID>3294950</ProdID>
                        <UPCDescription>Campbell Chunk/Heart Cheeseburger
                                Soup(Pantry)</UPCDescription>
                        <ProductType>1</ProductType>
                        <Quantity>1</Quantity>
                        <Weight>0.0</Weight>
                        <UOM>E</UOM>
                        <UnitPrice>1.5</UnitPrice>
                        <Substitution>1</Substitution>
                        <SystemGeneratedMessage>CIN:3294950|UPC:51000204028
                        </SystemGeneratedMessage>
                        <OrderedByQtyWt>N</OrderedByQtyWt>
                        <TotalTaxAmount>0.06525</TotalTaxAmount>
                        <ProductTaxCode>2038305</ProductTaxCode>
                        <ProductTaxRate>0.0435</ProductTaxRate>
                        <UPCInfo>
                                <UPC>51000204028</UPC>
                        </UPCInfo>
                </OrderLine>
                <PaymentType xsi:nil="true" />
                <PaymentNumber xsi:nil="true" />
        </OrderInfo>
</TSOrder>
```

```
<rule name="DontUseDoubleSlashOperatorNearRoot">
  <message>
   Avoid using the operator // near the root of a large tree
    </message>
  <xpath>
   //(@match | @select)[starts-with(., '//')]
    </xpath>
    <priority>2</priority>
    <example>
  <!-- VIOLATION -->
     <xsl:variable name="x" select="//x/y/z" />
     <!-- REPAIR -->
  <xsl:variable name="x" select="/a/b/x/y/z" />
    </example>
</rule>
```

202 → (points to `<xpath>`)

SYSTEM AND METHOD FOR DYNAMIC TRANSLATION CODE OPTIMIZATION

RELATED APPLICATIONS

This application claims priority to Indian Patent Application No. 201811014359 entitled "SYSTEM AND METHOD FOR DYNAMIC TRANSLATION CODE OPTIMIZATION," filed on Apr. 16, 2018, the content of which is hereby incorporated by reference in its entirety.

BACKGROUND

In e-commerce systems data translation occurs when one system interacts with another. Translation includes proper formatting of output from one system into an expected format for input into another system.

BRIEF DESCRIPTION OF DRAWINGS

Illustrative embodiments are shown by way of example in the accompanying drawings and should not be considered as a limitation of the present disclosure:

FIGS. 2A and 2B are illustrations of extensible markup language file utilized in a system for dynamic translation code optimization according to an exemplary embodiment.

DETAILED DESCRIPTION

Described in detail herein is a system for dynamic translation code optimization. The system receives an input module, a translation definition, and a rules specification at a cloud-based front-end application. The cloud-based front-end application can transmit the input module, the translation definition, and the rules specification to a back-end processing module. The back-end processing module parses the rules specification and the translation definition into respective data structures which are interoperable with each other. The rules specification is applied to the translation definition and a set of defects are generated based on the application of the rules. The input module can be parsed into a respective data structure and can be applied to the translation definition. The system can record system metrics based on the application of the translation definition to the input module. The system can generate a report based on the recorded system metrics and then transmit the report to the cloud-based front-end where the report and the set of defects are displayed through a graphical user interface. In some instances, the back-end processing module can resolve or attempt to resolve the defects and modify in the translation definition.

Over long term translation development projects, the iterative detection of defects and identification of optimization opportunities can create a feedback loop. Common optimization patterns can be identified through automated collection of system metrics and report generation to subsequently be incorporated into a rules specification. As new optimized patterns emerge over the course of the project, un-optimized translation code can be identified statically. The feedback loop leads to better translation code both computationally more efficient and lower in terms of maintenance cost.

Figure 1:
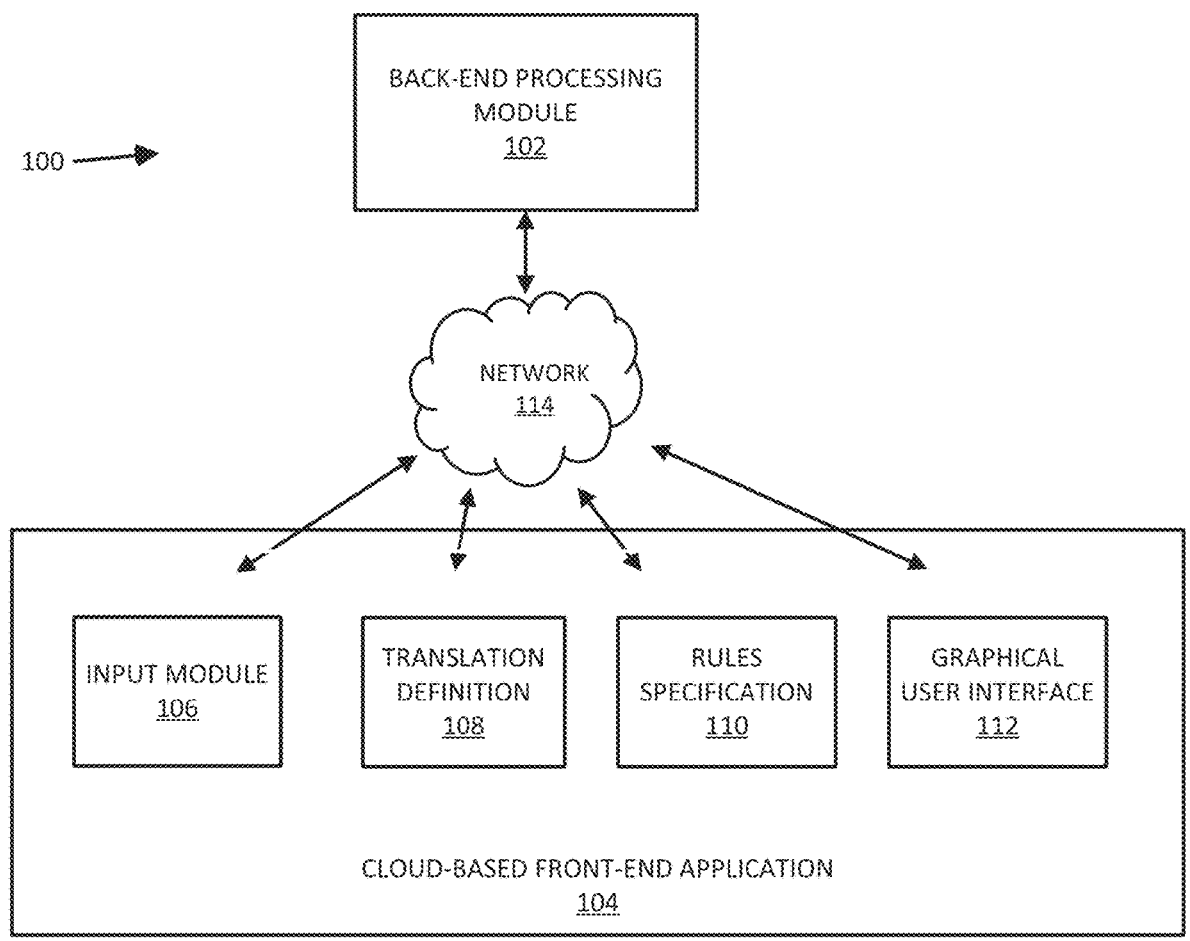
FIG. 1 is a block diagram illustrating a support system for dynamic translation code optimization according to an exemplary embodiment.

FIG. 1 is a block diagram 100 illustrating a support system for dynamic translation code optimization according to an exemplary embodiment. The system can include a back-end processing module 102 and a cloud-based front-end application 104. Communicatively coupling the back-end processing module 102 and the cloud-based front-end application 104 can be a network 114.

The back-end processing module 102 provides the functionality to parse, store, execute and analyze inputs related to the code translation. The back-end processing module 102 can execute in many environments not limited to those including Microsoft Windows, UNIX, Linux, and macOS. The back-end processing module 102 can be implemented as a single module with the above referenced functionality, or can be further abstracted in respective modules providing parsing, storing, executing, and analyzing functionality. Additionally, the back-end processing module 102 can include libraries or applications to implement any combination or all of the functionality referenced above. In a non limiting exemplary embodiment, the back-end processing module 102 can include libraries implementing core functionality components, accessed by application specific software code to control logic flow.

A user facing cloud-based front-end application 104 can provide an interface into the system. The cloud-based front-end application 104 can include a graphical user interface 112. Additionally, the cloud-based front-end application 104 can provide input mechanisms for the input module 106, the translation definition 108, and the rules specification 110. The cloud-based front-end application 104 can be implemented in web-based portable software development language such as Java, JavaScript, or hypertext markup language (HTML). The cloud-based front-end application 104 can be computing architecture independent in that the cloud-based front-end application can be executed on heterogeneous architectures without architecture-specific modification to the application code. In one embodiment, the cloud-based front-end application 104 can be implemented as an applet in a webpage viewed through a web browser, such as but not limited to Google Chrome, Apple Safari, Microsoft Internet Explorer, or Mozilla Firefox. Additionally, embodiments of the cloud-based front-end application 104 can take the form of browser extensions which allow architecture independent code to execute within a framework provided by a cross-platform web browser (e.g. Chrome).

The cloud-based front-end application 104 provides functionality to evaluate the performance of translations as well as enforce proper coding practices. The input module 106 corresponds to an input data set that can be evaluated by a rules specification 110. Additionally, that input data set can be utilized to evaluate a translation definition 108. In a non-limiting example embodiment, the input module 106 can be an extensible markup language (XML) file, the rules specification 110 can be an XML file, and/or the translation definition 108 can be an extensible stylesheet language transformation (XSLT) file.

The cloud-based front-end application 104 can accept an input module 106 as an input into the system 100. The input module 106 can be defined as the data to be translated from one format to another format. The input module 106 can be formatted in a standardized way for processing by standards-based libraries or applications, which can include third part libraries or applications. For embodiment in which the input module 106 is an extensible markup language (XML) file, the input module 106 can include tags, elements and attributes. Tags can demark the beginning and end of an element, which is a logical document component. Each element can include a begin tag and an end tag, as well as content between the begin and end tag. Additionally, elements can have a hierarchical or nested structure in which the content of an element can include child elements defined within the content. Attributes can include name-value pairs that exist within the tag of the element. An XML element 200A in FIG. 2A corresponds to sample content of an input module 106. The translation definition 108 can provide a syntax for the translation of the elements in the input module 106. For embodiment in which the translation definition 108 can be defined in an XSLT file, the XSLT file can define the formatting relationship between an element in the input module 106 and a corresponding element generated in the translation located in an output file. As such, the translation definition 108 determines the format of elements from the input module 106 as they would appear in the format of the output file.

The rules specification 110 provides a user-defined set of rules that the translation definition 108 should be conformant. An XSLT processor applies the rules specification 110 to the translation definition 108. The XSLT processor can parse both the translation definition 108 and the rules specification 110, store each in a memory space, and apply the rules specification 110 to the translations. Static XSLT processors can include but are not limited to the SAXON processor. The rules specification 110 can be XML conformant with tags, elements, and attributes. FIG. 2B corresponds to an example 200B of an XML-based rules specification 110.

A rule in the rules specification 110 can utilize tags and attributes to distinguish each unique rule. The back-end processing module 102 can utilize XPath evaluators 202 defined in the rules specification 110 as elements to each rule. XPath is a language developed by the World Wide Web Consortium for selecting nodes in an XML object. An XPath evaluator can be a "regular expression-like" string of characters designed by the programmer to pattern match XML elements. The evaluators can utilize an XPath expression to determine if each line in the translation definition 108 meets a criteria as implemented as the XPath expression. The criteria can include poor or undesirable coding practices which can violate an organization's coding standards and incur a "technical debt." Technical debt can include detectable coding practices that lead to future expenses to detect and correct such poor or undesirable coding practices. Additionally, the criteria can identify code fragments that can be optimized utilizing identified coding patterns thereby allowing the translation definition 108 to operate more efficiently. Through the iterative development process, dynamic profiling can lead to better optimized translation definitions. Consequently, the optimized code can be factored to identify coding practices leading to computational inefficiency, as evidenced by the a profiling report. The rules specification 110 can be augmented to include identified inefficient code, prior to profiling, and notify a programmer of needed correction.

The graphical user interface (GUI) 112 displays results and a set of defects. As with the cloud-based front-end application 104, the GUI 112 can be developed in a platform independent programming language. The GUI 112 can be implemented as a HTML file rendered in a web browser in the cloud-based front-end application. The GUI 112 can be generated at the back-end processing module 102 and presented at the cloud-based front-end application 104.

The network 114 communicatively couples the back-end processing module 102 and the cloud-based front-end application 104. In a non-limiting example embodiment, the network 114 can be a wide area network (WAN) or the Internet. The network 114 can be operable to transport data packets compatible with back-end processing module 102 and the cloud-based front-end application 104. In one embodiment, compatible data packets can include data packets with transmission control protocol (TCP) or user datagram protocol (UDP) routing information, as well as an accessible application layer. The network 114 can interface with other networks or servers. The network 114 can be a combination of wired and wireless connection inclusively.

Figure 3:
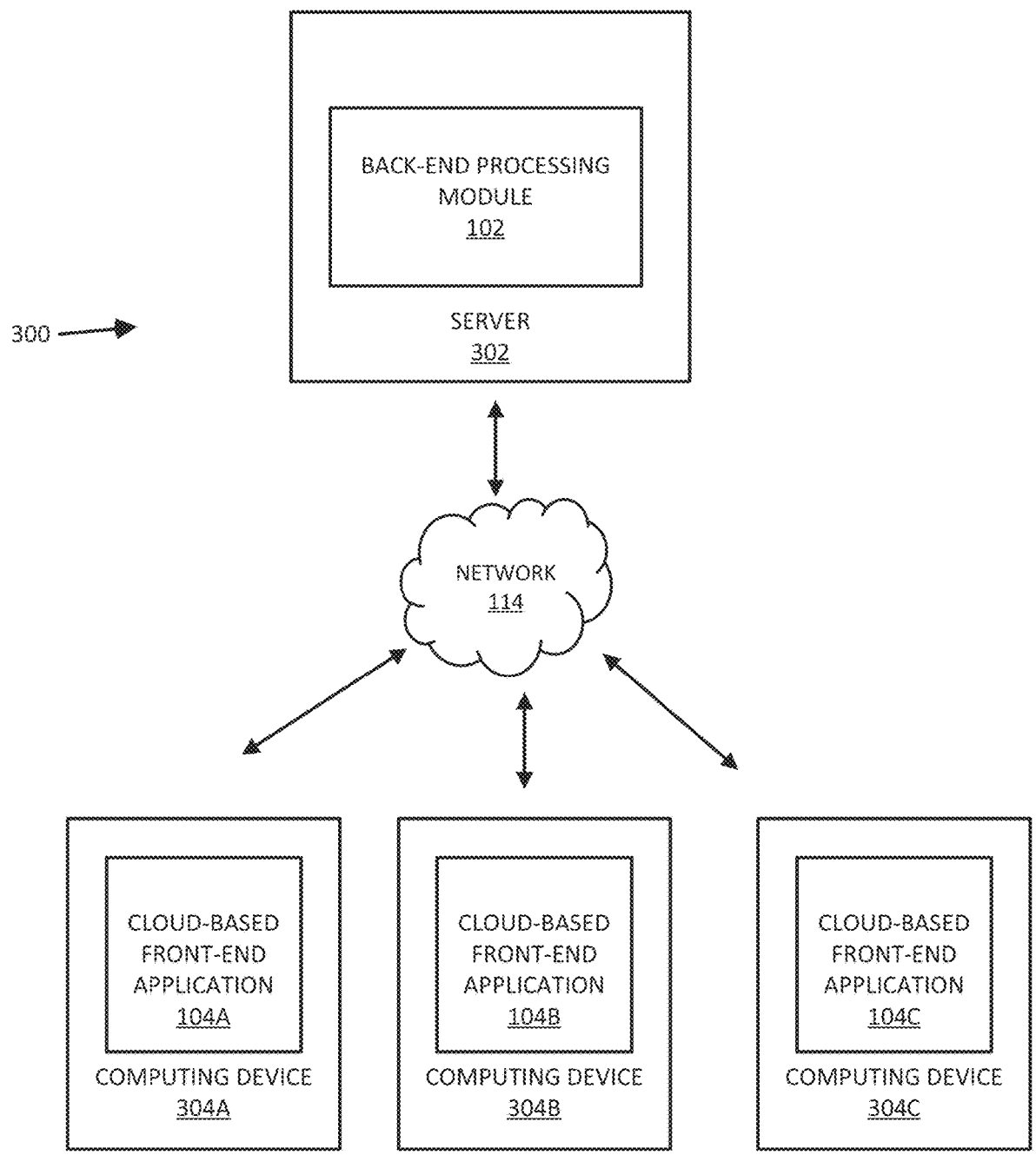
FIG. 3 is a block diagram illustrating a distributed system for dynamic translation code optimization according to an exemplary embodiment.

FIG. 3 is a diagram illustrating a distributed system 300 for dynamic translation code optimization according to an exemplary embodiment. The system 300 for dynamic translation code optimization can include a server 302. The server 302 may be implemented as a standalone hardware processing device or an abstracted cloud-based processing device. Additionally, the server 302 may be virtualized within a physical hardware instance or executing natively on a hardware processing device. The server 302 can execute the back-end processing module 102. Additionally, the server 302 can implement logistical modules for the generation of code to be rendered in the GUI 112. For example, the server 302 can implement a web server for the processing of hypertext transfer protocol (HTTP) requests and responses between the back-end processing module 102 and instances 104A-C of the cloud-based front-end application 104. Alternatively, another server (not shown) can handle the processing of the underlying support to facilitate the communication between the back-end processing module 102 and instance 104A-C of the cloud-based front-end application 104.

One or more computing devices 304A, 304B, 304C hosts one or more instances 104A, 104B, 104C of the cloud-based front-end application 104, respectively. The one or more computing devices 304A, 304B, 304C can vary in architecture and form factor. The one or more computing devices 304A, 304B, 304C can be mobile devices including but not limited to tablets, phones, and personal digital assistants. Alternatively, the one or more computing devices 304A, 304B, 304C can be traditional computing devices used for software development including but not limited to laptop PCs, desktop PCs and all in one PCs. The one or more computing devices 304A, 304B, 304C provide the platform to execute the architecture independent cloud-based front-end application 104.

Figure 4A:
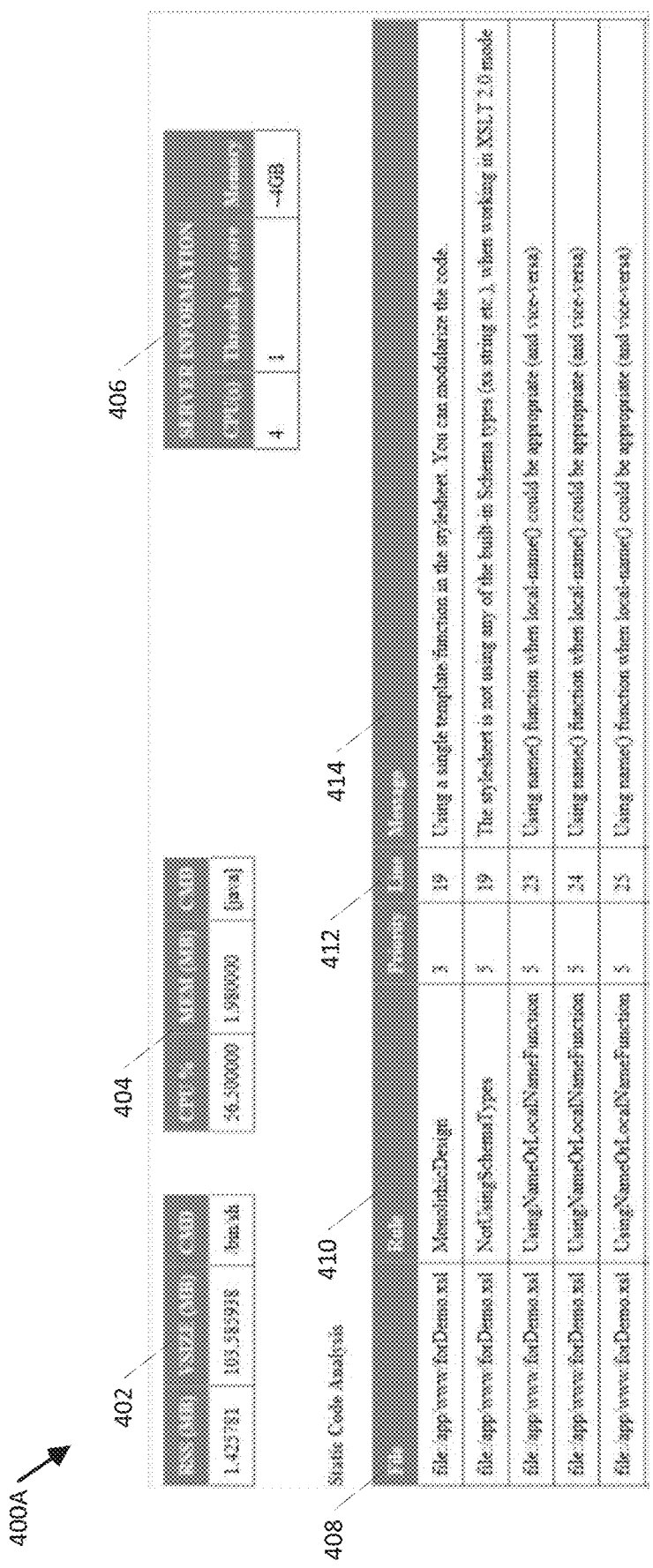
FIGS. 4A and 4B are illustrations of graphical user interfaces of a system for dynamic translation code optimization according to an exemplary embodiment.

FIG. 4A is an illustration 400A of an embodiment of the graphical user interface of the system for dynamic translation code optimization according to an exemplary embodiment. FIG. 3A corresponds to a set of defects as determined based on the application of a rules specification to a translation definition. The set of defects can be portrayed in tabular form. Each defect can be identified by a row in the table. Information corresponding to the defect can be displayed as columns in the table. Each defect in the set of defects can have an identification for a file 408, a rule 410, a line 412, and a message 414. The file 408 indicates the filename of the translation definition in which the defect occurred. The rule 410 corresponds to an entry in the rules specification. The rule column identifies the rule 410 that the translation definition violated. The line column corresponds to the line 412 within the translation definition in which the defect occurred. The message 414 provides a brief description of the defect that was found to allow a user some context as to the nature of the defect.

Additionally, the illustration 400A provides additional data points corresponding to the back-end processing module. The additional data points can include showing the available memory 402, the processor utilization 404, and additional server information 406. The additional data points can provide a user with a view point into the system health of the back-end processing module.

Figure 4B:
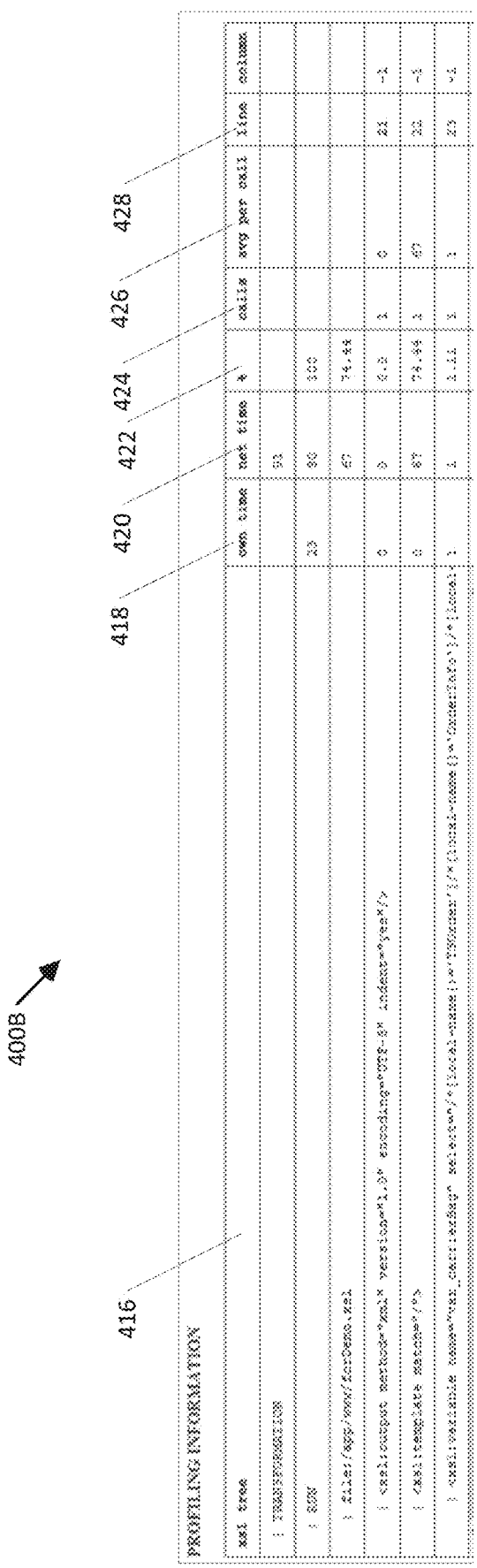

FIG. 4B is an illustration 400B of an embodiment of the graphical user interface of the system for dynamic translation code optimization according to an exemplary embodiment. FIG. 4B corresponds to a report of system metrics as determined based on the application of a translation definition to an input module. The report of system metrics can be portrayed in tabular form. The execution of each line in the translation definition can be identified by a row in the table. Information corresponding to the metric can be displayed as columns in the table. Additionally, the fields presented in the table can correspond to system level information available through system commands (e.g. 'top' in the Linux environment). The table presents metrics corresponding to parts of the translation definition in the form of an extensible stylesheet language (XSL) tree 416. The metrics collected for each part of the tree include own time 418, net time 420, percentage of total time 422, average time per call 426 and line number 428 of the translation definition. The own time 418 corresponds to the amount of time spent profiling in a specific level of the translation definition. The net time 420 is the amount of time spent profiling a specific element of the translation definition as well as all subsequent inclusive elements. The percentage of total time 422 corresponds to the percentage of time spent on an element of the translation definition divided by the total net time. The average time per call 426 corresponds to an averaging of the net time over multiple passes of an element in the translation definition. The line number 428 corresponds to the line number in the translation definition corresponding to the XSL tree 416.

Figure 5:
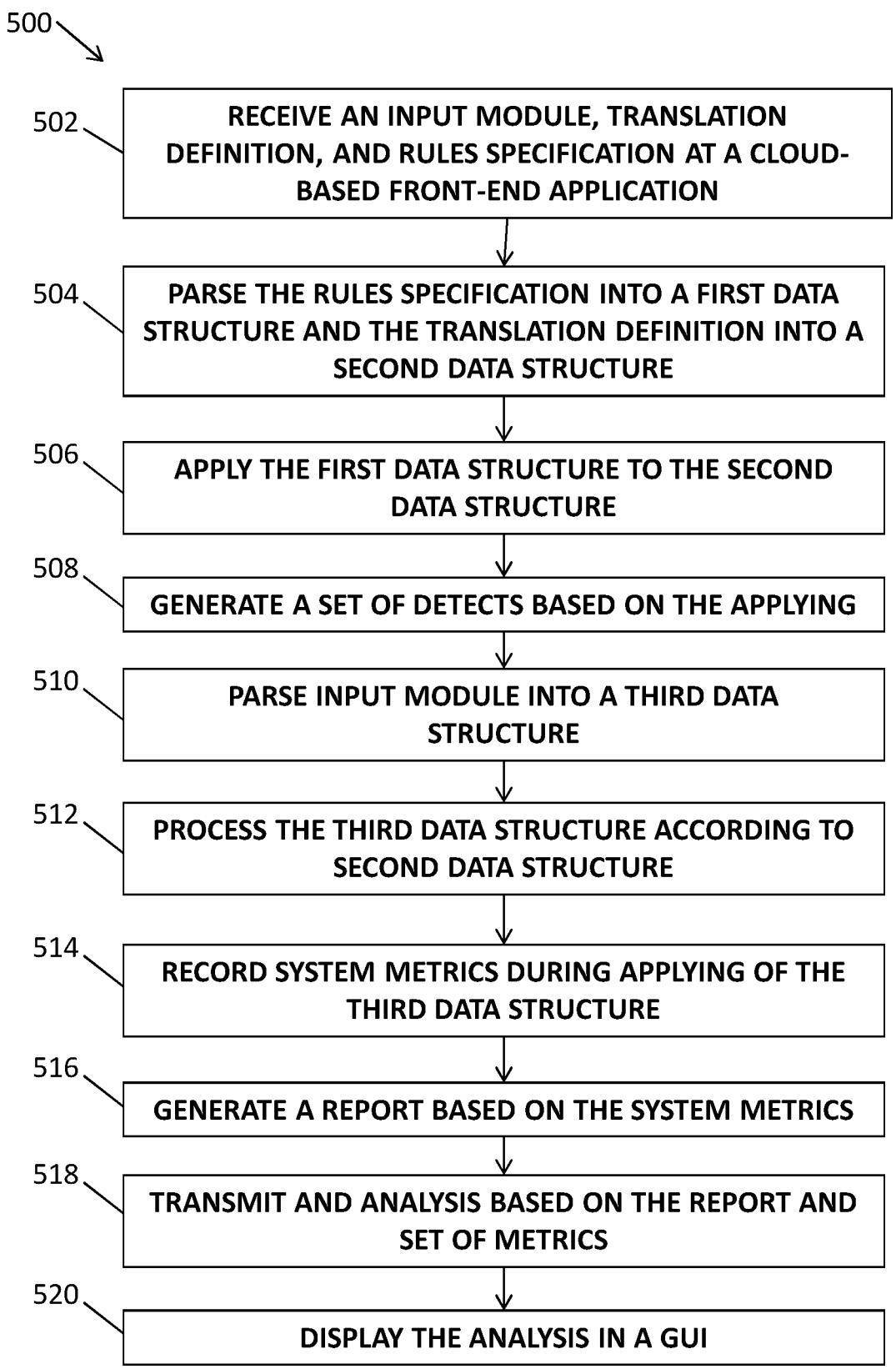
FIG. 5 is a flow diagram illustrating for dynamic translation code optimization according to an exemplary embodiment.

FIG. 5 is a flow diagram illustrating for dynamic translation code optimization according to an exemplary embodiment.

At step 502, the cloud-based front-end application receives an input module, translation definition and a rules specification. The input module can correspond to a XML input file, the translation definition can correspond to a XSLT file, and the rules specification can correspond to a XML file. As discussed above, the cloud-based front-end application can receive the input module, translation definition and a rules specification through GUI. The cloud-based front-end application transmits the input module, translation definition, and rules specification to the back-end processing module. The cloud-based front-end application encodes the input module, translation definition, and rules specification and utilizes underlying networking stacks to send the encoded package to the back-end processing module over the network.

At step 504, the back-end processing module parses the rules specification into a first data structure and the translation definition into a second data structure. The first data structure and the second data structure can be implemented in a document object model (DOM) pattern. The DOM allows the first data structure and the second data structure to be represented in data tree form. Each element can be represented as a node in the tree structure. Each node representing elements of the rules specification and the input module can be manipulated programmatically through the model. The back-end processing module receives the encoded package. The back-end processing module can decode the package and extract the input module, translation definition, and rule specification. The back-end processing module can parse each of the files. As described above, the back-end processing module can utilize libraries and applications, which include third party libraries and applications, to parse the input files. The libraries and applications can maintain data structures resultant of the parsing to operate on and provide to other functions within the back-end processing module.

At step 506, the back-end processing module applies the first data structure to the second data structure. Third party applications can provide interfaces for the applications of different data structures to one another. Operators can be defined within the software code of the back-end processing module to accept the two data structures as parameters and operate on the passed memory areas. The applying of the first data structure to the second data structure can include a non-executing static analysis of the rules specification and the translation definition.

At step 508, the back-end processing module generates a set of defects based on the applying. The set of defects comprise instances of an identified coding practice. The resultant output of the operators can be utilized to determine whether a line of the translation definition violates a rule in the rule specification. In one embodiment, the operator can be an XPath instruction.

At step 510, the back-end processing module parses the input module into a third data structure. As described above, the parsing can be accomplished utilizing third party libraries and applications capable of parse the structure and format of XSL, XML, and XSLT files. The third data structure can also be represented in a DOM pattern. The elements of the input module can be represented as nodes in a tree and can be manipulated programmatically.

At step 512, the back-end processing module applies the third data structure to the second data structure. The applying the third data structure to the second data structure can include inputting the third data structure and the second data structure to a translation execution library, such as SAXON.

At step 514, the back-end processing module records system metrics during the applying of the third data structure. The back-end processing module can record the metrics at various points in the execution utilizing system utilities such as 'top'. Alternatively, the back-end processing module can utilize libraries within the operating system (e.g. kstat in Solaris) to query the operating system directly. The system metrics can include a system level summary of utilized resources based on the applying of the third data structure to the second data structure. Alternatively, the system metrics can include a granular level summary of the utilized resources based on the applying of the third data structure to the second data structure.

At step 516, the back-end processing module generates a report based on the recorded system metrics. The system metrics may be output in a tabular report correlating performance data with locations within the translation specification.

At step 518, the back-end processing module transmits an analysis based on the report and the set of metrics. The back-end processing module encodes the analysis in a package and transmits the package to the cloud-based front-end application.

At step 520, the cloud-based front-end application displays the analysis in a GUI. The cloud-based front-end application decodes the package and displays the analysis in the GUI. The analysis can be HTML code rendered in a GUI presented within a web browser.

Figure 6:
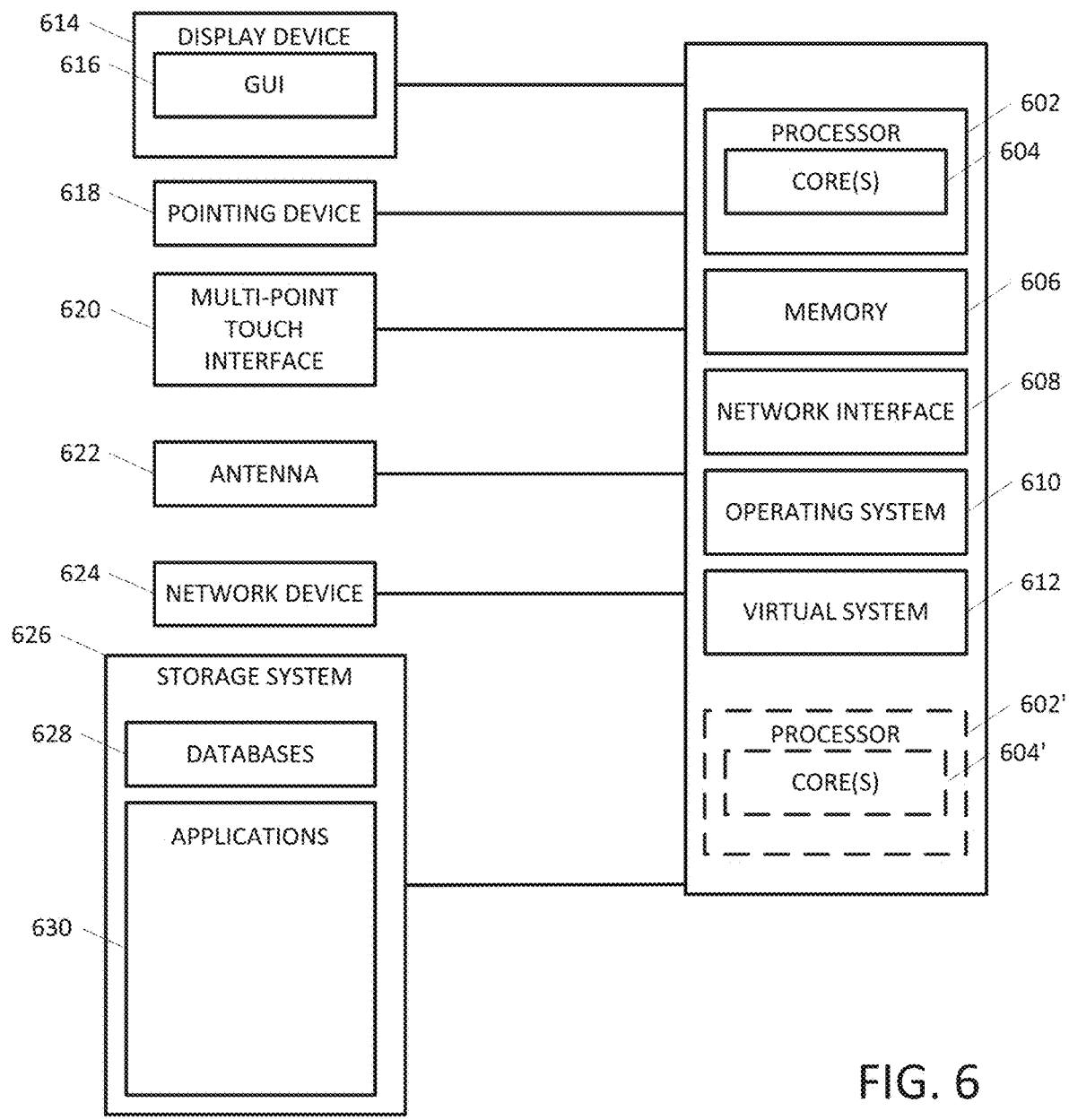
FIG. 6 depicts a block diagram an exemplary computing device in accordance with an exemplary embodiment.

FIG. 6 is a block diagram of an example computing device for implementing exemplary embodiments of the present disclosure. Embodiments of the computing device 500 can implement embodiments of the system for the optimization of information translation. For example, the computing device can be embodied as a portion of the server, and the computing devices. The computing device 600 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 606 included in the computing device 600 may store computer-readable and computer-executable instructions or software (e.g., the GUI 112) for implementing exemplary operations of the computing device 600. The computing device 600 also includes configurable and/or programmable processor 602 and associated core(s) 604, and optionally, one or more additional configurable and/or programmable processor(s) 602' and associated core(s) 604' (for example, in the case of computer systems having multiple processors/cores), for executing computer-readable and computer-executable instructions or software stored in the memory 606 and other programs for implementing exemplary embodiments of the present disclosure. Processor 602 and processor(s) 602' may each be a single core processor or multiple core (504 and 504') processor. Either or both of processor 602 and processor(s) 602' may be configured to execute one or more of the instructions described in connection with computing device 600.

Virtualization may be employed in the computing device 600 so that infrastructure and resources in the computing device 600 may be shared dynamically. A virtual machine 612 may be provided to handle a process running on multiple processors so that the process appears to be using only one computing resource rather than multiple computing resources. Multiple virtual machines may also be used with one processor.

Memory 606 may include a computer system memory or random access memory, such as DRAM, SRAM, EDO RAM, and the like. Memory 606 may include other types of memory as well, or combinations thereof. The computing device 600 can receive data from input/output devices. A user may interact with the computing device 600 through a visual display device 614, such as a computer monitor, which may display one or more graphical user interfaces 616, multi touch interface 620 and a pointing device 618.

The computing device 600 may also include one or more storage devices 626, such as a hard-drive, CD-ROM, or other computer readable media, for storing data and computer-readable instructions and/or software that implement exemplary embodiments of the present disclosure (e.g., back-end processing module 102). For example, exemplary storage device 626 can include one or more databases 628 for storing information associated with the set of defect or system metrics. The databases 628 may be updated manually or automatically at any suitable time to add, delete, and/or update one or more data items in the databases.

The computing device 600 can include a network interface 608 configured to interface via one or more network devices 624 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 622 to facilitate wireless communication (e.g., via the network interface) between the computing device 600 and a network and/or between the computing device 600 and other computing devices. The network interface 608 may include a built-in network adapter, network interface card, PCMCIA network card, card bus network adapter, wireless network adapter, USB network adapter, modem or any other device suitable for interfacing the computing device 600 to any type of network capable of communication and performing the operations described herein.

The computing device 600 may run any operating system 610, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 600 and performing the operations described herein. In exemplary embodiments, the operating system 610 may be run in native mode or emulated mode. In an exemplary embodiment, the operating system 610 may be run on one or more cloud machine instances.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components, or steps can be replaced with a single element, component, or step. Likewise, a single element, component, or step can be replaced with multiple elements, components, or steps that serve the same purpose. Moreover, while exemplary embodiments have been shown and described with references to particular embodiments thereof, those of ordinary skill in the art will understand that various substitutions and alterations in form and detail can be made therein without departing from the scope of the present disclosure. Further, still, other aspects, functions, and advantages are also within the scope of the present disclosure.

Exemplary flowcharts are provided herein for illustrative purposes and are non-limiting examples of methods. One of ordinary skill in the art will recognize that exemplary methods can include more or fewer steps than those illustrated in the exemplary flowcharts and that the steps in the exemplary flowcharts can be performed in a different order than the order shown in the illustrative flowcharts.

We claim:

1. A method for the optimization of information translation comprising:
   receiving an input module, translation definition, and rules specification at a back-end processing module from a computing device rendering a graphical user interface of a cloud-based front-end application, wherein the input module corresponds to an input data set to be translated from one format to another format, the rules specification is a user-defined set of rules, and the translation definition provides a syntax for translations of elements in the input module, parsing the rules specification and the translation definition into a first data structure and a second data structure, respectively, wherein the first data structure is interoperable with the second data structure, applying the first data structure to the second data structure, wherein the cloud-based front-end application of the first data structure to the second data structure identifies defects in the translation definition, generating a set of defects based on the cloud-based front-end application and displayable in a tabular form, each defect within the set of defects associated within the tabular form with an identification for a file associated with the defect, a rule, a line, and a message, parsing the input module into a third data structure, processing the third data structure according to the second data structure, recording system metrics based on the processing of the third data structure, generating a report based on the system metrics, transmitting an analysis to the cloud-based front-end application, wherein the analysis comprises the set of defects and the report, receiving the analysis from the back-end processing module, and displaying the analysis in a graphical user interface, wherein the graphical user interface correlates a relative data within the analysis with the input module, translation definition and the rules specification.

2. The method of claim 1, wherein the set of defects comprise instances of an identified coding practice.

3. The method of claim 1, wherein the system metrics comprise a system level summary of utilized resources based on the applying of the third data structure to the second data structure.

4. The method of claim 1, wherein the system metrics comprise a granular level summary of the utilized resources based on the applying of the third data structure to the second data structure.

5. The method of claim 1, wherein the input module corresponds to a extensible markup language (XML) input file, the translation definition corresponds to a extensible stylesheet language transformation (XSLT) file, and the rules specification corresponds to a extensible markup language (XML) file.

6. The method of claim 1, the applying the third data structure to the second data structure comprises inputting the third data structure and the second data structure to a translation execution library.

7. The method of claim 1, wherein the applying the first data structure to the second data structure comprises a non-executing static analysis of the rules specification and the translation definition.

8. A non-transitory computer readable medium for the optimization of information translation, having stored thereon, instructions that when executed in a computing system, cause the computing system to perform operations comprising:

receiving an input module, translation definition, and rules specification at a back-end processing module from a computing device rendering a graphical user interface of a cloud-based front-end application, wherein the input module corresponds to an input data set to be translated from one format to another format, the rules specification is a user-defined set of rules, and the translation definition provides a syntax for translations of elements in the input module, parsing the rules specification in to a first data structure and the translation definition into a second data structure wherein the first data structure is interoperable with the second data structure, applying the first data structure to the second data structure, wherein the cloud-based front-end application of the first data structure to the second data structure identifies defects in the translation definition, generating a set of defects based on the cloud-based front-end application and displayable in a tabular form, each defect within the set of defects associated within the tabular form with an identification for a file associated with the defect, a rule, a line, and a message, parsing the input module into a third data structure, processing the third data structure according to the second data structure, recording system metrics based on the processing of the third data structure to the second data structure, generating a report based on the system metrics, transmitting an analysis to the cloud-based front-end application wherein the analysis comprises the set of defects and the report, and displaying the analysis in a graphical user interface, wherein the graphical user interface correlates a relative data within the analysis with the input module, translation definition and the rules specification.

9. The computer readable medium of claim 8, wherein the set of defects comprise instances of an identified coding practice.

10. The computer readable medium of claim 8, wherein the system metrics comprise a system level summary of utilized resources based on the applying of the third data structure to the second data structure.

11. The computer readable medium of claim 8, wherein the system metrics comprise a granular level summary of the utilized resources based on the applying of the third data structure to the second data structure.

12. The computer readable medium of claim 8, the applying the third data structure to the second data structure comprises inputting the third data structure and the second data structure to a translation execution library.

13. The computer readable medium of claim 8, wherein the applying the first data structure to the second data structure comprises a non-executing static analysis of the rules specification and the translation definition.

14. A system for optimization of information translation comprising:

one or more servers executing a back-end processing module communicatively coupled to a computing device rendering a graphical user interface of a cloud-based front-end application configured to:

receive an input module, a translation definition and a rules specification from the cloud-based front-end application, wherein the input module corresponds to an input data set to be translated from one format to another format, the rules specification is a user-defined set of rules, and the translation definition provides a syntax for translations of elements in the input module, parse the rules specification and the translation definition into a first data structure and a second data structure, respectively, wherein the first data structure is interoperable with the second data structure, apply the first data structure to the second data structure, wherein the cloud-based front-end application of the first data structure to the second data structure identifies defects in the translation definition,
generate a set of defects based on the cloud-based front-end application and displayable in a tabular form, each defect within the set of defects associated within the tabular form with an identification for a file associated with the defect, a rule, a line, and a message,
parse the input module into a third data structure,
process the third data structure according to the second data structure,
record system metrics based on the processing of the third data structure,
generate a report based on the system metrics, and
transmit an analysis to the cloud-based front-end application wherein the analysis comprises the set of defects and the report; and
wherein the cloud-based front-end application receives the analysis from the back-end processing module and displays the analysis in the graphical user interface, wherein the graphical user interface correlates a relative data within the analysis with the input module, translation definition and the rules specification.

15. The system of claim 14, wherein the set of defects comprise instances of an identified coding practice.

16. The system of claim 14, wherein the system metrics comprise a system level summary of utilized resources based on the applying of the third data structure to the second data structure.

17. The system of claim 14, wherein the system metrics comprise a granular level summary of the utilized resources based on the applying of the third data structure to the second data structure.

18. The system of claim 14, wherein the input module corresponds to a extensible markup language (XML) input file, the translation definition corresponds to a extensible stylesheet language transformation (XSLT) file, and the rules specification corresponds to a extensible markup language (XML) file.

19. The system of claim 14, the applying the third data structure to the second data structure comprises inputting the third data structure and the second data structure to a translation execution library.

20. The system of claim 14, wherein the applying the first data structure to the second data structure comprises a non-executing static analysis of the rules specification and the translation definition.

* * * * *